(12) United States Patent
Micheletti et al.

(10) Patent No.: US 12,442,167 B2
(45) Date of Patent: Oct. 14, 2025

(54) SUPPORT FRAME FOR USE WITH KITCHEN SINK AND OVER SINK WORK STATION

(71) Applicant: Franke Technology and Trademark Ltd., Hergiswil (CH)

(72) Inventors: Roberto Micheletti, Verona (IT); Ngoc An Huynh, Sirmione (IT)

(73) Assignee: Franke Technology And Trademark Ltd., Hergiswil (CH)

( * ) Notice: Subject to any disclaimer, the term of this patent is extended or adjusted under 35 U.S.C. 154(b) by 188 days.

(21) Appl. No.: 17/941,135

(22) Filed: Sep. 9, 2022

(65) Prior Publication Data
US 2023/0075858 A1    Mar. 9, 2023

(30) Foreign Application Priority Data
Sep. 9, 2021    (EP) ..................................... 21195753

(51) Int. Cl.
*E03C 1/324*    (2006.01)

(52) U.S. Cl.
CPC ................... *E03C 1/324* (2013.01)

(58) Field of Classification Search
CPC .......... A47L 19/00; A47L 19/02; A47L 19/04; A47J 47/20; A47J 47/005; E03C 1/186
See application file for complete search history.

(56) References Cited

U.S. PATENT DOCUMENTS

| | | | | |
|---|---|---|---|---|
| 736,032 | A * | 8/1903 | Silver | A47K 3/122 297/251 |
| 1,389,908 | A * | 9/1921 | Shults | A47L 19/04 D32/55 |
| 1,908,128 | A * | 5/1933 | De Bie | A47L 19/04 211/41.3 |
| 3,713,179 | A * | 1/1973 | Dubiel | A47K 3/001 4/577.1 |
| 6,276,675 | B1* | 8/2001 | Shamoon | A47J 47/20 269/302.1 |
| 6,508,368 | B1* | 1/2003 | Arce, Jr. | A47J 47/20 211/41.3 |
| 7,322,573 | B1* | 1/2008 | Edmond | A47J 47/005 269/302.1 |

(Continued)

FOREIGN PATENT DOCUMENTS

| | | |
|---|---|---|
| AU | 2007201750 | 11/2007 |
| CN | 202044139 U * | 11/2011 |

(Continued)

*Primary Examiner* — Erin Deery
(74) *Attorney, Agent, or Firm* — Volpe Koenig (57) ABSTRACT

A support frame (1) for use with a kitchen sink (10), the support frame (1) having at least two extendable arms (2.1, 2.2) to hold the frame over a kitchen sink (10), which arms (2.1, 2.2) extend parallel to each other, defining a free space (3) therebetween, and are connected, at respective ends thereof, by connecting handles (4.1, 4.2). The arms (2.1, 2.2) each have at least two parts (2.1*a*, 2.1*b;* 2.2*a*, 2.2*b*) of different cross section, with a first part (2.1*b*, 2.2*b*) of smaller cross section slidably inserted into a second part (2.1*a*, 2.2*a*) of larger cross section, and the second parts (2.1*a*, 2.2*a*), at an end portion thereof, include a sealing element (2.1*c*, 2.2*c*), preferably a ring-shaped elastomeric or plastics seal, for slidably centering and aligning the first parts (2.1*b*, 2.2*b*) and said second parts (2.1*a*, 2.2*a*).

15 Claims, 11 Drawing Sheets

(56) References Cited

U.S. PATENT DOCUMENTS

| | | | |
|---|---|---|---|
| 9,386,886 B2 | 7/2016 | Lee et al. | |
| 2008/0148475 A1* | 6/2008 | Lin | A47L 17/02 4/639 |

FOREIGN PATENT DOCUMENTS

| | | |
|---|---|---|
| CN | 204033196 | 12/2014 |
| CN | 204146922 | 2/2015 |
| JP | H08140871 | 6/1996 |

* cited by examiner

SUPPORT FRAME FOR USE WITH KITCHEN SINK AND OVER SINK WORK STATION

INCORPORATION BY REFERENCE

The following documents are incorporated herein by reference as if fully set forth: European Patent Application No. 21195753.5, filed Sep. 9, 2021.

TECHNICAL FIELD

According to a first aspect, the present invention relates to a support frame for use with a kitchen sink.

The invention also relates to combinations of a kitchen sink and a support frame according to said first aspect of the invention.

The invention further relates to an over sink work station.

BACKGROUND

An over sink work station comprising a support frame is known, e. g., from U.S. Pat. No. 9,386,886 B2. Said document discloses a frame member with extendable arms to hold the work station over a kitchen sink. The frame has two or more openings which are adapted to removably receive an insert of corresponding dimensions. The frame is overall planar configuration and has legs that are intended to support the frame when placed on a flat surface such as a counter when the work station is not in use over a sink.

Due to the above-described configuration, moisture and dirt will enter in a space between the frame and the extendable arms, thus degrading hygiene and hindering the sliding motion between arms and frame.

Also, said openings only allow to use the prior art frame with matching inserts, and thus severely limit the use thereof.

SUMMARY

It is the object of the present invention to overcome said disadvantages and to devise a support frame for use with a kitchen sink, combinations of a kitchen sink with such support frame, and an over sink work station that are more flexible in use while also improving hygiene and reliability of use.

These objects are achieved, according to the present invention, by means of a support frame with one or more of the features described herein, by means of a combination of a kitchen sink and a support frame with the combination of one or more of the features described herein, and by means of an over sink work station with one or more of the features described herein.

Advantageous further embodiments of the present invention are defined below and in the claims.

According to a first aspect of the present invention, there is provided a support frame for use with a kitchen sink, said support frame having at least two extendable arms to hold the frame over a kitchen sink, which arms extend parallel to each other, thus defining a free space therebetween, and are connected, at respective ends thereof, by means of connecting handles, wherein said arms each comprise at least two parts of different cross section, with a first part of smaller cross section slidably inserted into a second part of larger cross section, and wherein said second parts, at an end portion thereof, comprise a sealing element, preferably a ring-shaped elastomeric or plastics seal, for slidably centering and aligning said first parts and said second parts.

In this way, no dirt and/or moisture can enter in a space between said first and second parts. This provides improved hygiene and reliability of use. In this way, said sealing elements further make sure that said arms stay parallel during any sliding movement.

According to a further embodiment of the support frame, said sealing element (also referred to as a bushing) comprises a hole or recess, and said first parts comprise a resilient pin or protrusion which engages the hole or recess when said first part and said second part are in a predefined relative position, in particular said first part being completely inserted into said second part.

With such a (small) pin that has been designed to flow inside said bushing and to snap in said (small) hole or recess in order to perform a click-effect when closed, improper sliding without control can be prevented. This gives the user a better perception of robustness, solidity and durability.

The pin can have a spherical end cap, which provides improved functionality with respect to inducing a transverse movement of the pin when slidably moving said arms inside one another.

In another embodiment of the support frame, said pin or protrusion is an integral part of at least one of said connecting handles, preferably located on a portion of said at least one of said connecting handles, which portion is inserted into a respective end portion of said first parts.

In this way the required number of constituent parts is limited, which improves manufacturing effort and reduces costs.

Furthermore, said pin can be resilient, preferably by arranging it on a resilient protrusion or extension of said at least one of said connecting handles. This further provides improved functionality with respect to inducing a transverse movement of the pin when slidably moving said arms inside one another.

In a preferred embodiment of support frame according to the present invention, said connecting handles present a U-shaped configuration, when looked upon perpendicularly with respect to said planes. Such U-shaped configuration comprises an inner leg or middle leg and two outer legs. In this way, when looked upon perpendicularly with respect to said planes, the overall support frame can present the form of a simple rectangle, so that it can be used with a whole variety of kitchen sinks.

In yet another preferred embodiment of the support frame according the invention, said arms define a first plane and said connecting handles define a second plane, said second plane being spaced apart from and oriented parallel to said first plane.

Said connecting handles define a second plane, at least with portions thereof. This is equivalent to saying that the connecting handles need not be located in said second plane in their entirety.

Applicant has noted that the prior art device is only compatible with a limited variety of kitchen sinks, mainly because of said legs that extend from an underside of the frame. Furthermore, due to its planar configuration, no secure positioning of the frame is possible with respect to the kitchen sink. Therefore, in order to provide improved positioning safety, the above-defined embodiment of the support frame according to the present invention can be used in such a way that the extended arms, which define said first plane, are located within a sink bowl while the connecting handles, which define said second plane, are placed—at least partly—in a region of the sink edge to hold the frame over a kitchen sink. Thus, the support frame cannot easily slide off the kitchen sink. Furthermore, due to the spacing apart of said first plane and second plane, respectively, items placed on the support frame can be positioned flush with the sink edge and/or with a countertop, into which the sink is inserted, thus provided enhanced ergonomics of use.

Due to free space defined between said extendable arms, the support frame according to the present invention is not limited to any particular dimension of items to be used with the support frame, as long as they can be placed on said arms or fit in therebetween.

The feature of having extendable arms allows to adapt the support frame to sinks of different dimensions and/or to place the support frame on a kitchen sink with different orientations relative to said kitchen sink.

In another embodiment of the support frame according to the invention, said outer legs of said U-shaped connecting handles, in a transition region, extend in a direction oblique or perpendicular to said first plane and to said second plane. In other words: In said transition region, configuration of the support frame changes from said first plane to said second plane. This change can either be achieved in direct fashion, if said connecting handles, in said transition region, extend essentially perpendicular to said first plane and to said second plane, respectively. However, it has proved advantageous if said connecting handles, in said transition region, extend in a direction which is oblique to said first plane and to said second plane, respectively. In this way, there can be some kind of self-centering effect of the support frame when placing same over a kitchen sink.

In yet another embodiment of a support frame according to the present invention, on the one side of said transition region, facing said arms, said connecting handles can extend in said first plane, and on the other side of said transition region, away from said arms, said connecting handles can extend in said second plane. In this way, said connecting handles can be said to present a step-like profile or a configuration in the form of an abstract letter "S".

In order to ensure secure placement of the support frame over a kitchen sink, in a highly advantageous further embodiment thereof, on said other side of the connecting handles the latter are fitted with no-slip pads, preferably made from silicone, on a surface oriented towards said first plane.

For aesthetical reasons but also to achieve a relatively large contact area of the support frame with respect to the sink, in a further embodiment of the support frame according to the present invention said arms and said connecting handles have a rectangular, preferably square, cross section.

In order to resist daily use in a moist environment, according to another embodiment of the support frame according to the present invention said arms are preferably made of metal, in particular stainless steel.

In order to make said arms extendable, a highly advantageous further embodiment of the support frame according to the present invention comprises that said arms each comprise at least two parts of different cross section, with a first part of smaller cross section slidably inserted into a second part of larger cross section.

Applicant has found that, in a further embodiment of the support frame according to the present invention, said connecting handles are best made from a plastics material, preferably a thermoplastic resin, most preferably SUR-LYN®, or from reinforced nylon, PA6.

According to a second aspect thereof, the present invention relates to a combination of a kitchen sink and a support frame according to any one of the preceding claims, wherein the sink has at least one bowl having an edge at least at two opposing sides thereof, preferably a circumferential edge, and the support frame is placed on said edge with an underside of its connecting handles, said underside preferably corresponding to said other side of said connecting handles, as defined earlier.

According to another aspect of the present invention, the latter relates to a combination of a kitchen sink and a support frame according to any one of the preceding claims, wherein the sink has at least one bowl having a step profile at least at two opposing sides thereof, preferably a circumferential step profile, and the support frame is placed on said step profile with an underside of its connecting handles, said underside preferably corresponding to said other side of connecting handles, as defined earlier.

In this way, the present invention enables various possibilities of combining a kitchen sink and a support frame, depending on an actual configuration of the sink.

According to another aspect of the present invention, the latter relates an over sink work station, comprising the support frame according to the invention and at least one accessory item, for instance a chopping board or a bowl, wherein said arms at placed at a distance that corresponds to a dimension of a fixing structure on said accessory item, wherein preferably, a) in the case of a bowl, a width of said bowl corresponds to a free distance between said arms, and b) in the case of a chopping board, the latter comprises a number of protrusions on one of its surfaces, said protrusions being spaced apart to contact said arms either on an inner side or on an outer side thereof.

In this context, the term "inner side" defines a side of a given arm which faces said free space, while "outer side" defines a side of a given arm which faces away from said free space. Preferably, said protrusions are arranged such that they come in contact with respective inner sides of the support frame arms. However, it is also possible to space apart said protrusions so that the come into contact with respective outer sides of the support frame arms. It is even possible to arrange an even greater number of protrusions so that some of them come in contact with said inner sides while others come into contact with said outer sides of the support frame arms, thus preferably clamping said arms between pairs of protrusions.

For hygienical and ecological reasons, in a further embodiment of the work station according to the present invention, said chopping board is preferably made of an organic material, preferably of wood or bamboo, and said protrusions are devised as feet made from an elastomeric material, preferably silicone. In this way, said feet can interact with the arms of the support frame in clamping manner in order to secure the hold of the chopping board on the support frame. Furthermore, said feet can be used to securely place the chopping board on any other (planar) surface, e.g., a table or work top, when not in use in connection with said over sink work station.

According to yet another further embodiment of the work station according to the present invention, said feet have a T-shaped cross section with an upper horizontal leg and a lower vertical leg, wherein preferably said upper leg is located on said chopping board surface, most preferably at least partly within a recess in said chopping board surface, and preferably said lower leg protrudes perpendicularly from said chopping board surface, wherein preferably said lower leg tapers toward a free end thereof. In this way, said upper horizontal leg can come into contact with an upper side of the support frame arms while said lower vertical leg can make a contact with a side (inner side or outer side, as defined earlier) of said support frame arms. Thus, the chopping board can be securely held on said support frame arms, and it will not scratch or otherwise marks said arms when slid relative to the latter.

As cited before, different accessory items can be used in the context of the inventive over sink work station. In the case of a bowl, said bowl can have holes at least in a bottom part thereof and can therefore serve as a drainer. However, said bowl can also have closed sides and bottom walls, thus potentially serving as a food container for storing fruit in a refrigerator or the like. To this end, it can be provided with a lid or cover. Said bowls need not be of fixed volume, but can have collapsible sidewalls.

BRIEF DESCRIPTION OF THE DRAWINGS

Additional features and advantages of the present invention will now be described in exemplary fashion in connection with the appended drawings.

DETAILED DESCRIPTION

Figure 1A:
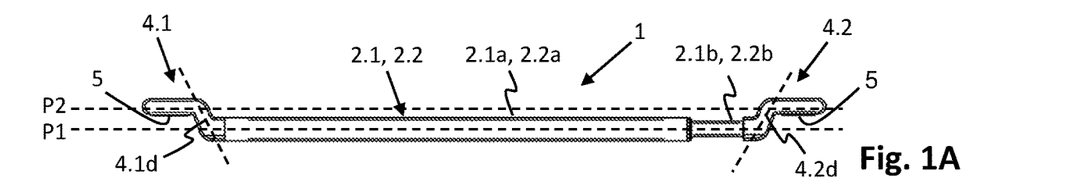
FIGS. 1A-1D show different use of a support frame according to the present invention.
Figure 1B:
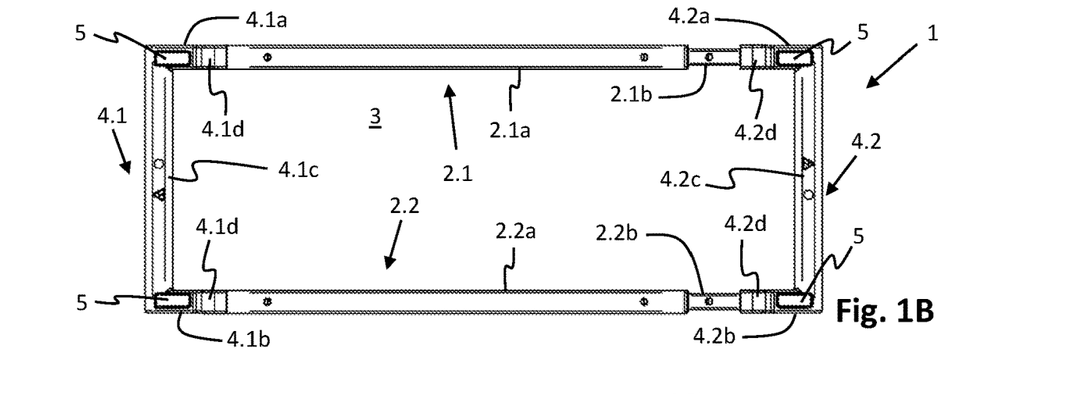
Figure 1C:
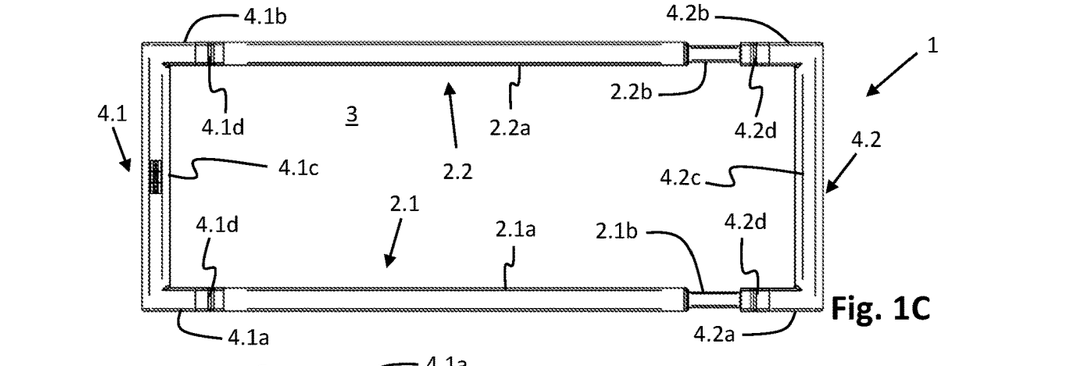
Figure 1D:
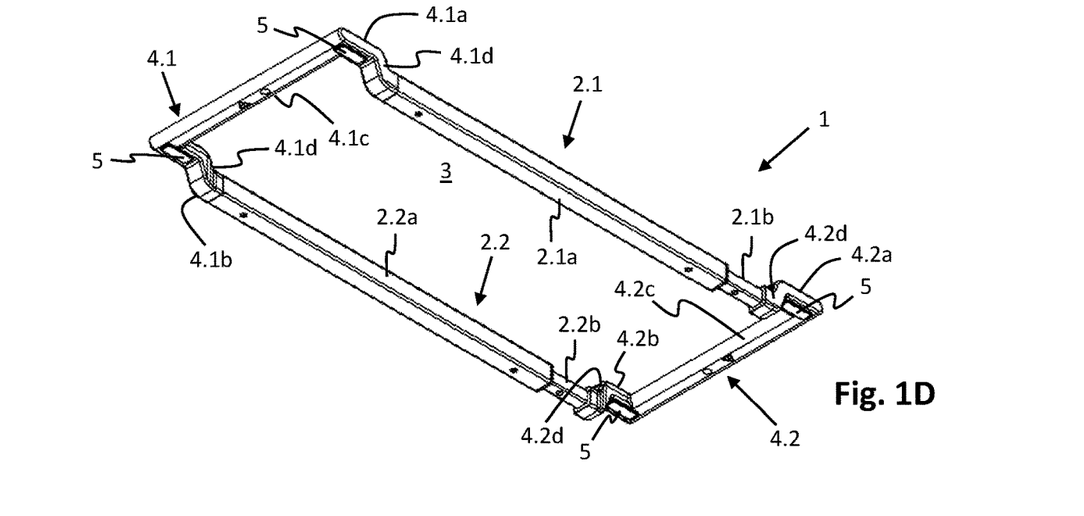

FIGS. 1A-1D show various different views of support frame for use with a kitchen sink according to the present invention. Said support frame is denoted by means of reference numeral 1. FIG. 1A shows a front (or rear) view, FIG. 1B shows a bottom view, FIG. 1C shows a top view, and FIG. 1D shows a perspective view of the support frame 1. Support frame 1 comprises two extendable arms 2.1, 2.2, which arms 2.1, 2.2 extend parallel to each other. In this way, said arms 2.1, 2.2 define a free space 3 therebetween, while also defining a first plane P1, as can best be seen from FIG. 1A. Each of said arms 2.1, 2.2 comprises two parts 2.1*a*, 2.1*b*; 2.2*a*, 2.2*b* that are slidable relative to each other. This will be explained in detail further below. Respective ends of said arms 2.1, 2.2 are connected by means of connecting handles 4.1, 4.2, which connecting handles 4.1, 4.2, at least with portions thereof, define a second plane P2, as can best be seen from FIG. 1A. Said second plane P2 is spaced apart from an oriented parallel to said first plane P1.

The connecting handles 4.1, 4.2, when looked upon perpendicularly with respect to said planes P1, P2, present a U-shaped configuration, comprising two outer legs 4.1*a*, 4.1*b*; 4.2*a*, 4.2*b* as well as an inner leg or middle leg 4.1*c*, 4.2*c*.

As can best be seen from FIGS. 1A and 1D, said U-shaped connecting handles 4.1, 4.2 further comprise respective transition regions 4.1*d*, 4.2*d* as part of said outer legs 4.1*a*, 4.1*b*; 4.2*a*, 4.2*b* in which transition regions 4.1*d*, 4.2*d* they extend in a direction that is oblique with respect to said first plane P1 and second plane P2. On one side of said transition region 4.1*d*, 4.2*d*, facing said arms 2.1, 2.2, said connecting handles 4.1, 4.2 thus extend in said first plane P1. On the other side of said transition region 4.1*d*, 4.2*d*, away from said arms 2.1, 2.2, said connecting handles 4.1, 4.2 thus extend in said second plane P2. Again, this can best be seen in FIG. 1A.

As can be gathered from FIGS. 1B and 1D, respectively, on said other side the connecting handles 4.1, 4.2 are equipped with no-slip pads 5 on a surface oriented towards said first plane P1.

As can be gathered from FIGS. 1A-1D, said arms 2.1, 2.2 and said connecting handles 4.1, 4.2 have a square cross section that need not be constant. While said arms 2.1, 2.2 can be made of stainless steel, said connecting handles 4.1, 4.2 are preferably made from a plastics material, preferably a thermoplastic resin, most preferably SURLYN®, an ionomer resin produced by DuPont de Nemours, Inc. SURLYN® ionomers are used in wide variety of fruit and non-fruit packaging, as well as pharma and medical packaging applications.

For increased intelligibility, not all reference numerals introduced in FIG. 1 will be shown again in following FIGS. 2A-2B, 3A-3B, 4A-4B, 5A-5B, 6, 7, 8A-8C, 9, 10, 11A-11B, and 12. Discussion of the following Figures will focus on additional aspects that are not shown in FIGS. 1A-1D.

Figure 2A:
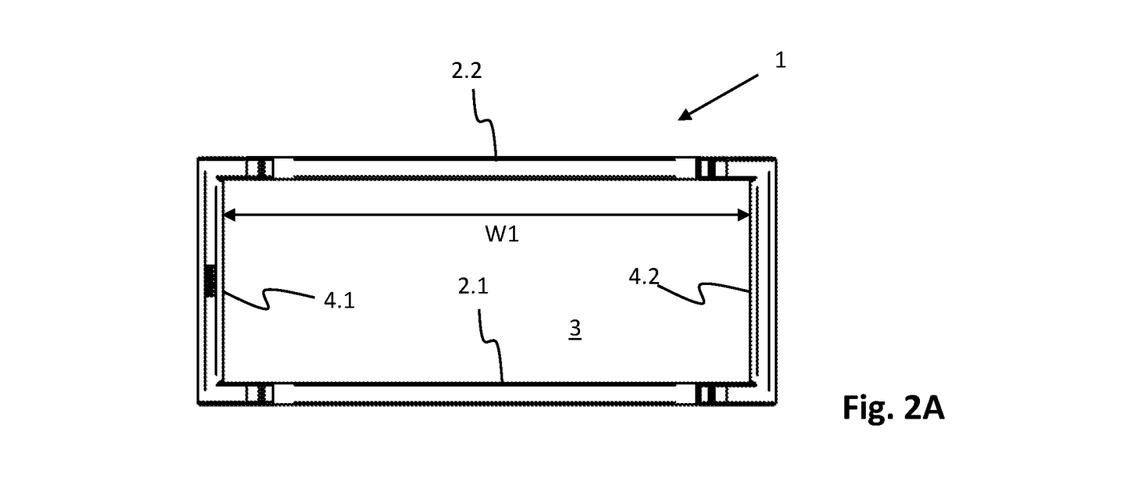
FIGS. 2A-2B show the support frame of FIGS. 1A-1D in an extended and in a retracted state.
Figure 2B:
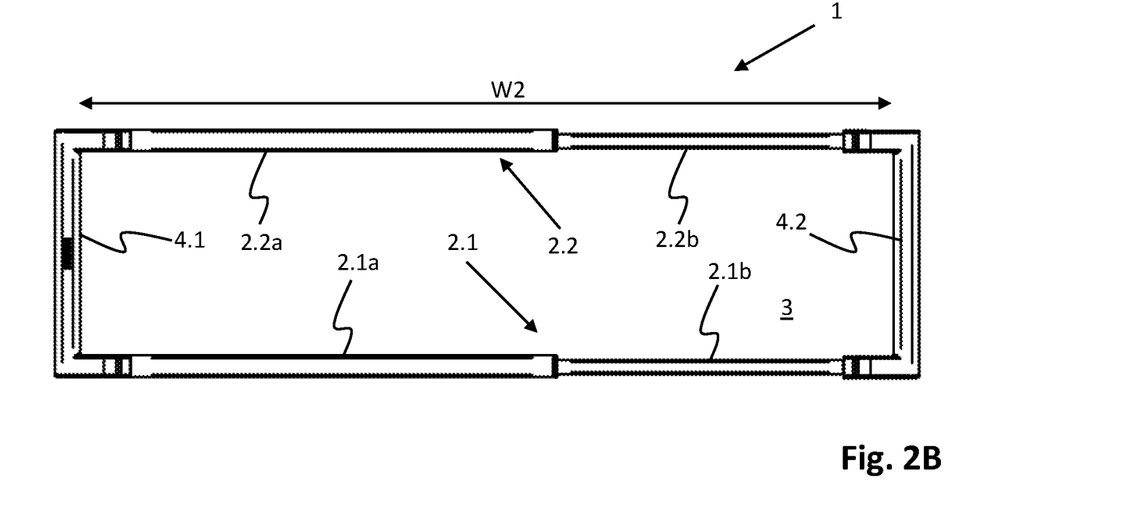

As can be seen from FIGS. 2A-2B, the extendable arms 2.1, 2.2 allow to change a dimension of support frame 1 so that it can be placed over sinks of different dimensions. Extending or retracting said arms 2.1, 2.2 changes a distance between the connecting handles 4.1, 4.2, thus also changing dimensions of the free space 3. In FIG. 2A, minimum width W1 can be equal to 34 cm, while in FIG. 2B maximum width W2 can be equal to 54 cm. A section of first arm part 2.1*b*, 2.2*b* can be 10 mm×10 mm, while a section of second arm part 2.1*a*, 2.2*a* can be equal to 15 mm×15 mm. The invention is by no means limited to the particular values stated above, which are only given by way of example.

Figure 3A:
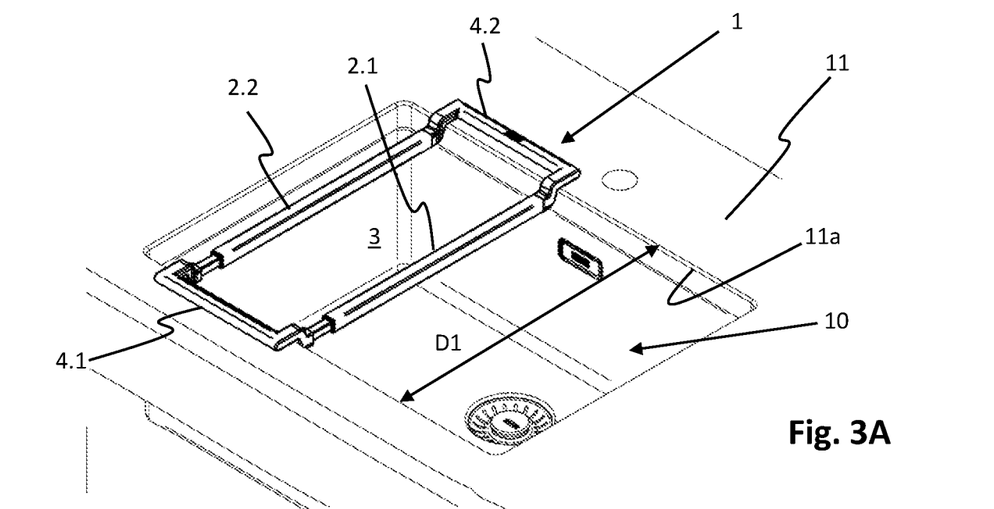
FIGS. 3A-3B show different ways to place the support frame according to FIGS. 1A-1D over a kitchen sink.
Figure 3B:
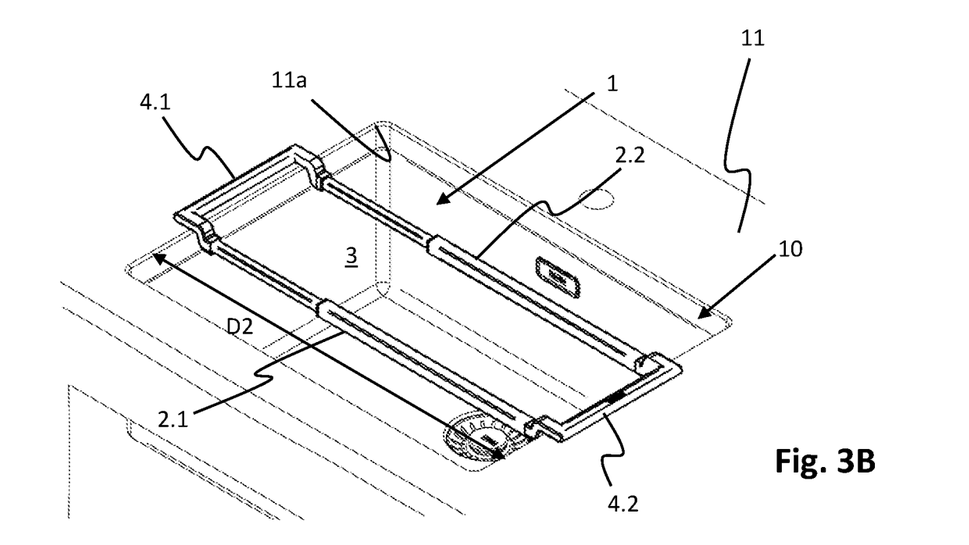

FIGS. 3A-3B shows how the support frame 1 according to FIGS. 1 and 2 can be used together with a kitchen sink 10, which sink 10 is positioned underneath a countertop 11, which countertop 11 presents a rectangular cut-out 11*a*, the dimensions of which essentially correspond to dimensions of the sink 10. In FIG. 3A, support frame 1 is in a configuration in which arms 2.1, 2.2 are mostly retracted. It is placed over sink 10 along a smaller dimension D1 thereof. In FIG. 3B, arms 2.1, 2.2 are mostly extended, and support frame 1 is placed over sink 10 along a bigger dimension D2 thereof. Support frame 1 is used in such a way that the connecting handles 4.1, 4.2 rest on the countertop 11 with their no-slip pads (cf. FIGS. 1B, 1D) the arms 2.1, 2.2, i. e., the first plane P1 (cf. FIG. 1A) extends beneath a level of countertop 11 within an opening of sink 10, thus providing improved safety. Furthermore, as can be gathered from FIG. 3, any accessory item to be placed on support frame 1 can extend flush with countertop 11 due to the fact that arms 2.1, 2.2 of support frame 1 extend in a plane (plane P1, cf. FIG. 1A) which is located beneath that particular region of connecting handles 4.1, 4.2 that is supported on countertop 11 (cf. no-slip pads 5 in FIGS. 1A-1D).

Figure 4A:
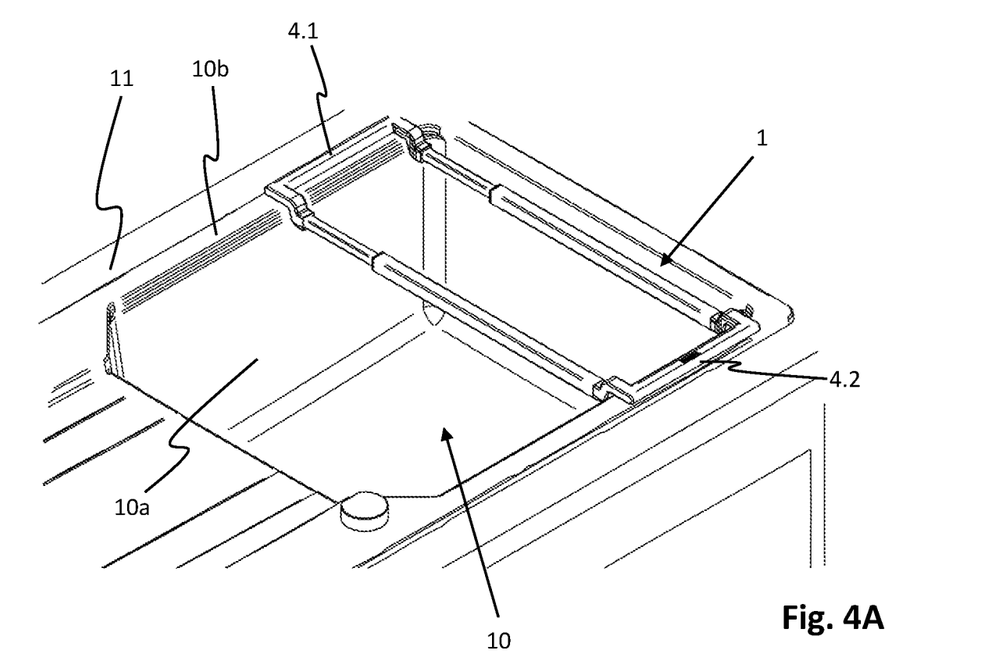
FIGS. 4A-4B show a first combination of a support frame according to the present invention and a kitchen sink.
Figure 4B:
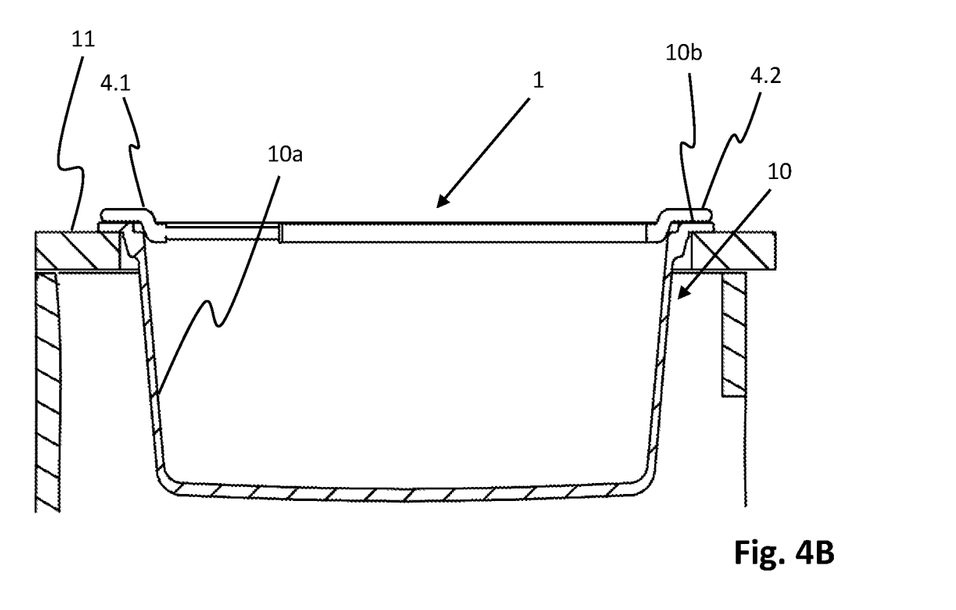

FIGS. 4A-4B shows a first combination of a support frame 1 according to the present invention and a kitchen sink 10. The sink 10 has at least one bowl 10a having an edge 10b at least at two opposing sides thereof. Preferably, said edge 10b is a circumferential edge. Support frame 1 is placed on said edge 10b with an underside of its connecting handles 4.1, 4.2, said underside preferably mean the side on which are located the no-slip pads 5 according to FIGS. 1A-1D.

FIG. 4A shows said combination in a perspective view while FIG. 4B shows a sectional view of the above-described combination. As can be gathered from FIG. 4B, sink 10 is supported on countertop 11 by means of said edge or rim 10b.

Another combination is shown in FIGS. 5A-5B, wherein again FIG. 5A is a perspective view, and FIG. 5B is a sectional view.

Although FIGS. 4A-4B and 5A-5B show the same sink 10, this must not necessarily be the case.

Figure 5A:
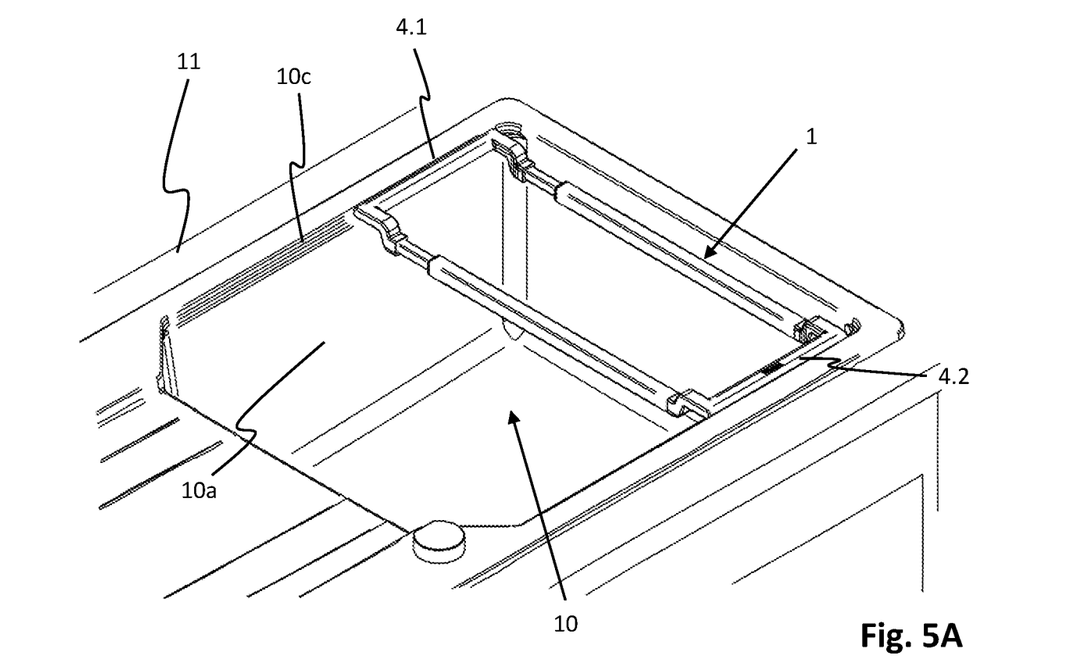
FIGS. 5A-5B show a second combination of the support frame according to the present invention and a kitchen sink.
Figure 5B:
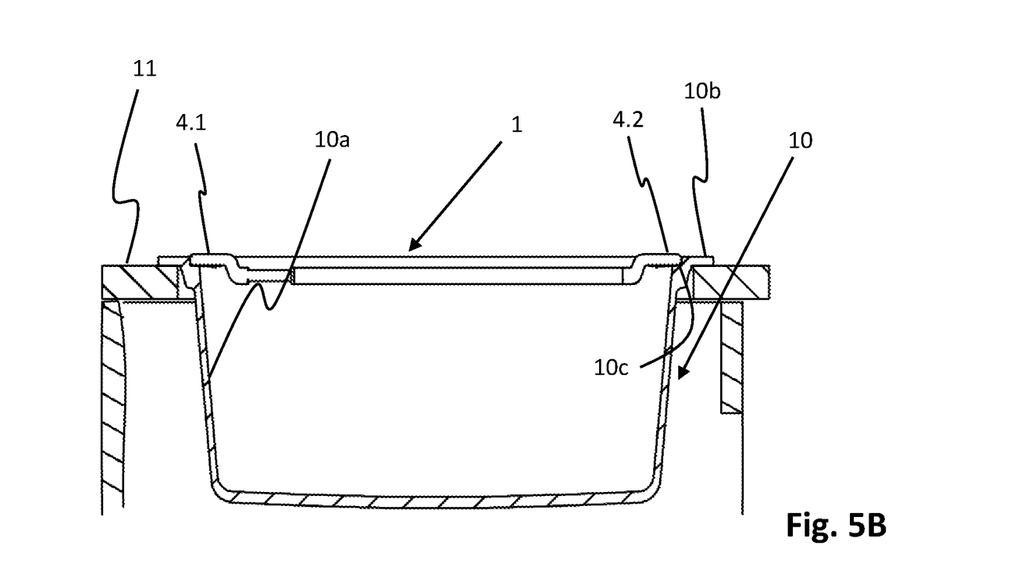

According to FIGS. 5A-5B, the sink 10 has at least one bowl 10a having a step profile 10c at least at two opposing sides thereof, preferably a circumferential step profile. Support frame 1 is placed on said step profile 10c with an underside of its connecting handles 4.1, 4.2. As stated before, said underside preferably corresponds to that side of the connecting handles 4.1, 4.2 on which are located the no-slip pads 5 (cf. FIGS. 1A-1D).

As can be seen from FIGS. 4A-4B and 5A-5B, the support frame 1 adapts easily to different sink configurations and thus not require said edge 10b and/or said step profile 10c (cf. FIGS. 3A-3B, where the support frame 1 is placed over an undermount sink 10, which presents neither edge nor step profile).

Figure 6:
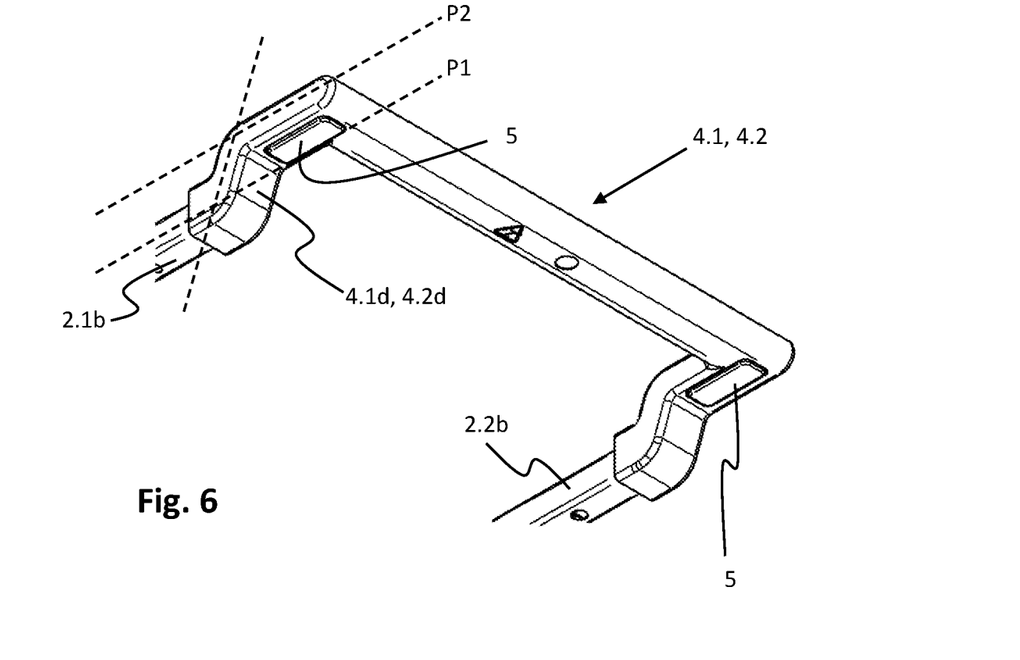
FIG. 6 shows a detail of a support frame according to the present invention.

FIG. 6 shows a detail of the support frame 1 as far as connecting handles 4.1, 4.2 are concerned. FIG. 6 nicely illustrates the arrangements of no-slip pads 5 and the oblique configuration of the connecting handles 4.1, 4.2 in said transition regions 4.1d, 4.2d.

Figure 7:
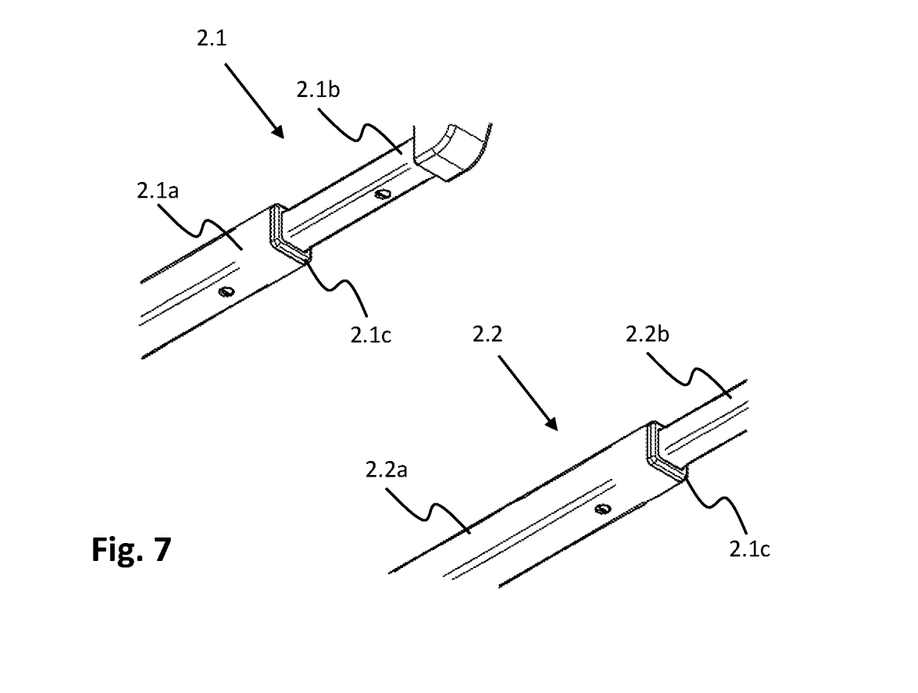
FIG. 7 shows another detail of a support frame according to the present invention.

FIG. 7 focuses on the support frame arms 2.1, 2.2. As stated before, said arms 2.1, 2.2 each comprise at least two parts 2.1a, 2.1b, 2.2a, 2.2b of different cross section, with a first part 2.1b, 2.2b of smaller cross section slidably inserted into a second part 2.1a, 2.2a of larger cross section. Said second parts 2.1a, 2.2a comprise a ring-shaped elastomeric or plastics sealing element 2.1c, 2.2c, which is arranged at (e.g., inserted in) a respective end of said second arm parts 2.1a, 2.2a for slidably centering and aligning said first arm parts 2.1b, 2.2b and said second arm parts 2.1a, 2.2a, respectively. Furthermore, said sealing elements 2.1c, 2.2c prevent any moisture or dirt from entering between said arm parts 2.1a, 2.2a; 2.1b, 2.2b, which might otherwise impair with their relative sliding motion.

In this way, said first and second parts are held in a concentric position and move one into the other basically without friction, i.e., inside sliding. The sliding mechanism is fully integrated inside the arms.

Figure 8A:
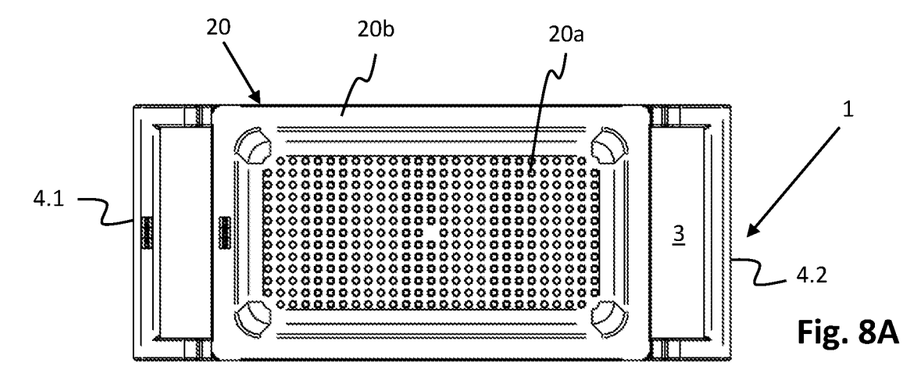
FIGS. 8A-8C show a support frame according to the present invention together with various accessory items.
Figure 8B:
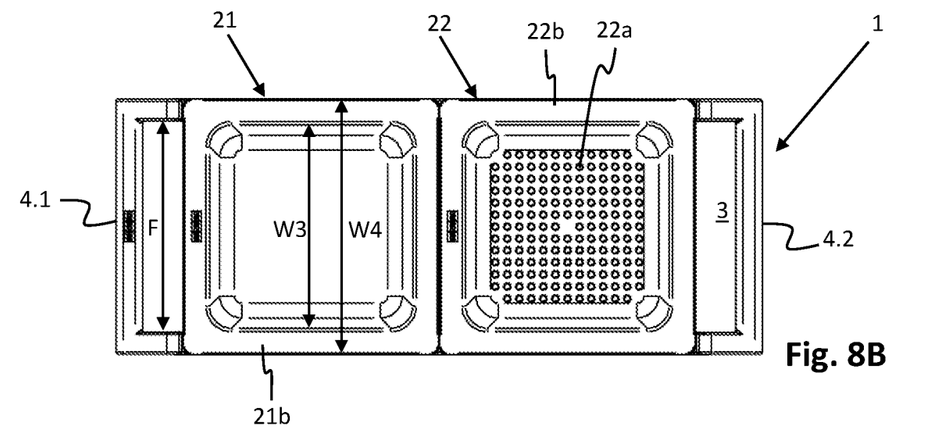
Figure 8C:
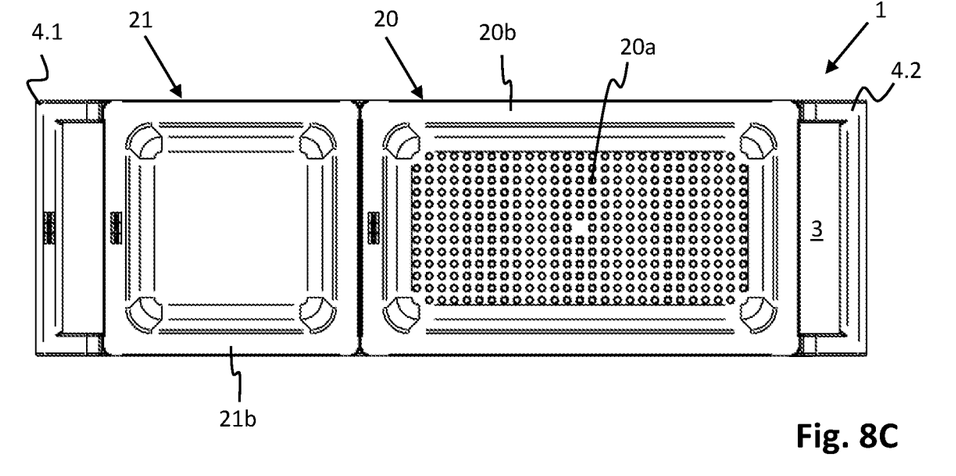

FIGS. 8A-8C show the support frame 1 in various states of extension together with a number of accessory items 20-22, thus forming an over sink work station, which can be placed over a kitchen sink as shown in FIGS. 3A-3B, 4A-4B, and 5A-5B. Accessory item 20 is a bowl with openings 20a in its bottom wall and can therefore be used for draining (food) according to FIG. 8A. Bowl 20 is of rectangular format. Accessory items 21, 22 according to FIG. 8b are also bowl-shaped; however, bowl 21 has a solid bottom wall while bowl 22 has corresponding openings 22a. Both bowls 21, 22 are of square format.

According to FIG. 8C, bowl 20 of FIG. 8A is combined with bowl 21 of FIG. 8B.

Figure 9:
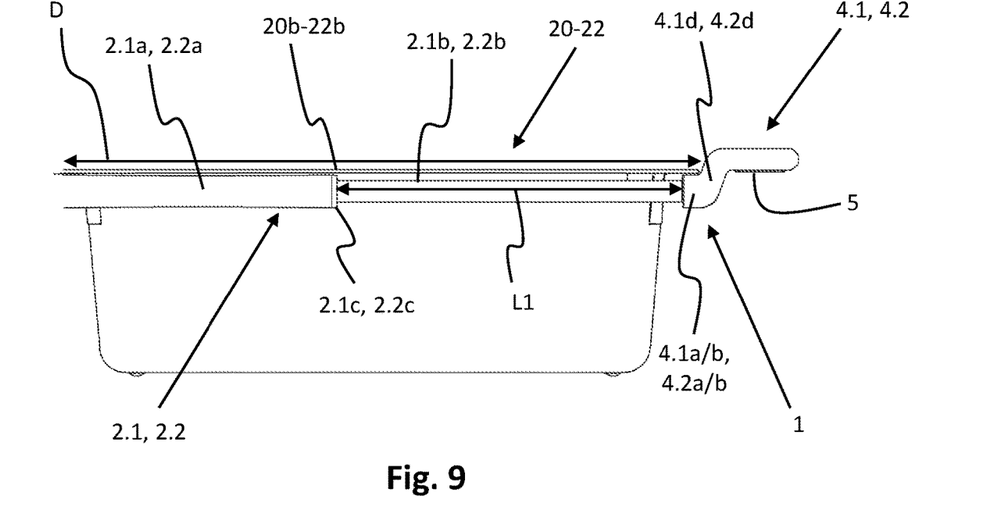
FIG. 9 shows an over sink work station according to the present invention comprising a support frame and an accessory item in the form of a bowl.

As further illustrated in FIG. 9, bowls 20-22 according to FIGS. 8A-8C are placed with their corresponding edges or rims 20b-22b on the arms 2.1, 2.2 of support frame 1 while extending through said free space between said arms 2.1, 2.2.

As can be further gathered from FIG. 9, advantageously, the cross section of the connecting handles 4.1, 4.2 at least in a region of their outer legs 4.1a, 4.1b, 4.2a, 4.2b equals a cross section of second arm part 2.1a, 2.2a, so that said rim 20b-22b can be placed thereon according to FIG. 9 in level fashion.

If a free length L1 of first arm part 2.1b, 2.2b is greater than a corresponding dimension D of rim 20b-22b, then said rim 20b-22b can be placed entirely on first arm part 2.1b, 2.2b (not shown).

As can further be gathered from FIG. 9, the connecting handles 4.1, 4.2 need not be of constant cross section. In the example shown, connecting handles 4.1, 4.2 increase in cross section towards the distal ends of outer legs 4.1a/b, 4.2a/b. This increase in cross section may only occur in the direction perpendicular to planes P1, P2 (cf. FIGS. 1A-1D), while cross section of connecting handles 4.1, 4.2 remains constant in a direction parallel to said planes.

Referring again to FIGS. 8A-8C, a width W3 of bowl 21 preferably corresponds to a free distance F between arms 2.1, 2.2 of support frame 1. This is equivalent to a fixing structure of or on accessory items 20-22. Furthermore, an overall width W4 of accessory items 20-22 preferably corresponds to said free distance F plus a corresponding dimension of the connecting handles 4.1, 4.2 on either side of said free space 3. The same holds with respect to the embodiment shown in FIGS. 10 to 12 (cf. FIG. 12).

Although not explicitly shown in FIGS. 8a and 8c, the same also holds for the accessory items shown therein.

Figure 10:
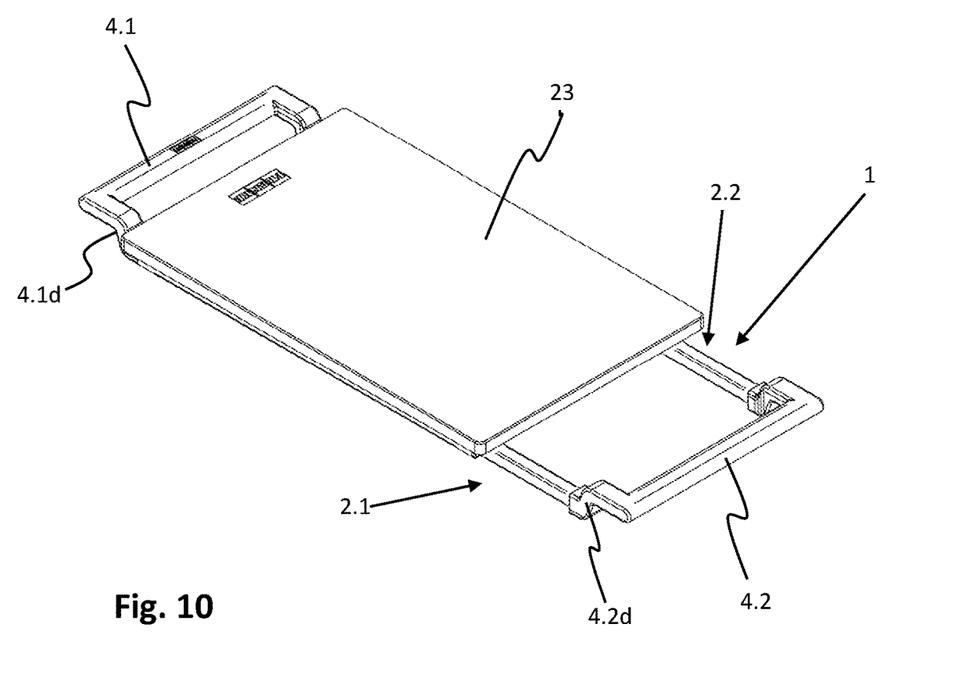
FIG. 10 shows an over sink work station according to the present invention comprising a support frame and an accessory item in the form of a chopping board.

FIG. 10 illustrates an alternative over sink work station comprising support frame 1 and a chopping board 23. Preferably, said chopping board 23 is of rectangular format and essentially made of bamboo. It can be placed on support frame 1 in such a way that it essentially compensates for the level difference incurred by means of transition region 4.1d, 4.2d.

Figure 11A:
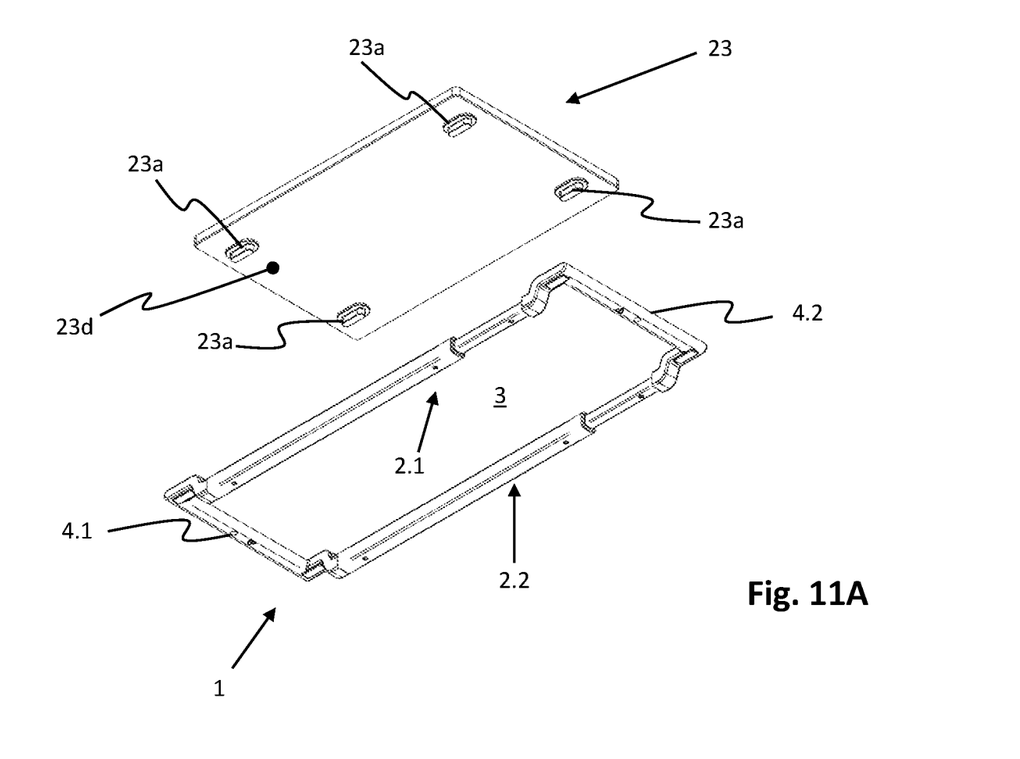
FIGS. 11A-11B show details of the work station according to FIG. 10.
Figure 11B:
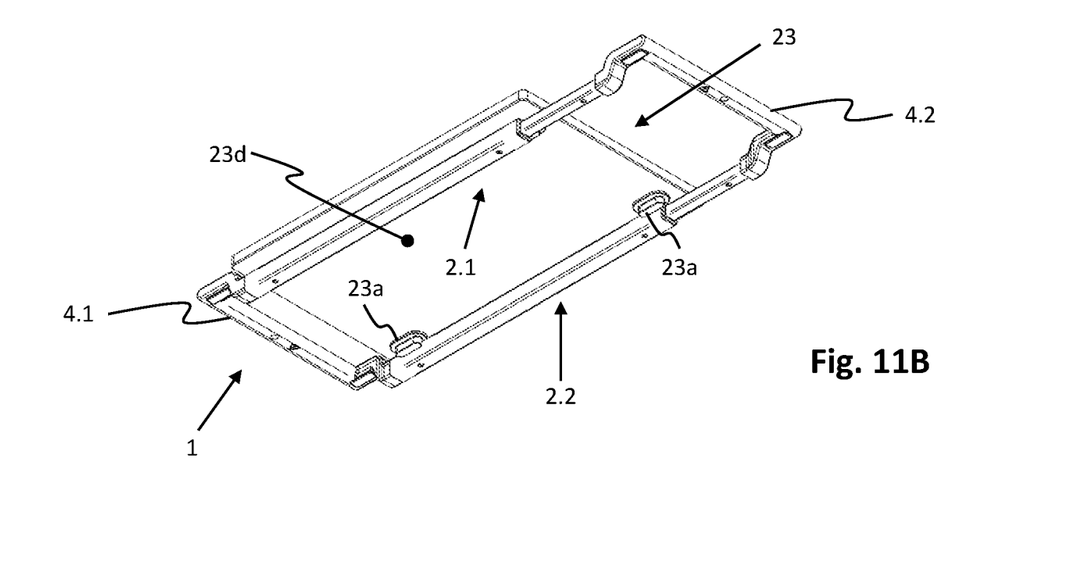
Figure 12:
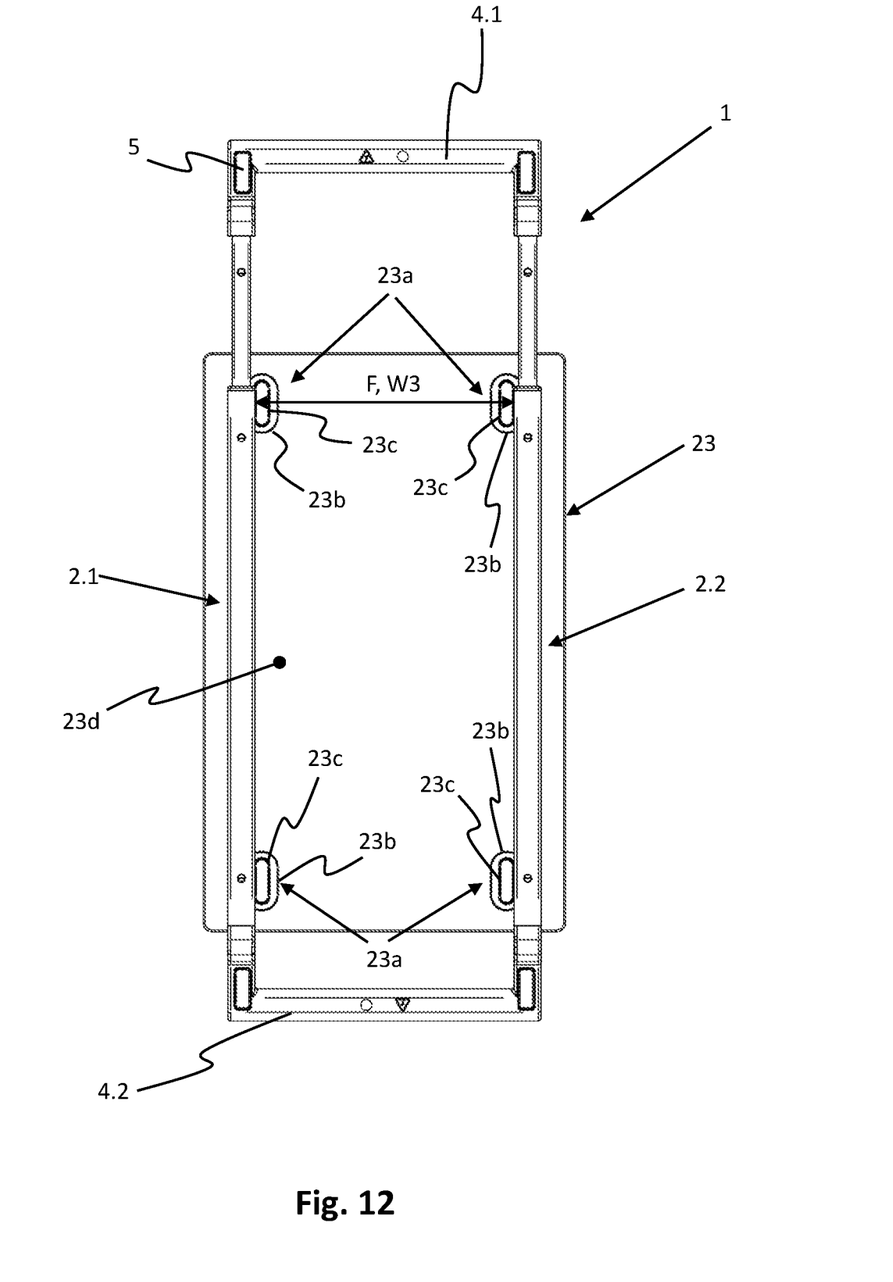
FIG. 12 shows another view of the work station according to FIGS. 10 and 11.

FIGS. 11A-11B and 12 provide details of chopping board 23 and its interaction with support frame 1.

Chopping board 23, on an underside 23d thereof, comprises a number of protrusions 23a. According to the embodiment shown, one protrusion 23a is located in each corner of chopping board 23. Said protrusions 23a are spaced apart in order to contact the support frame arms 2.1, 2.2 on respective inner sides thereof. As stated before, said inner side corresponds to the side of a given arm which faces said free space 3. A total width W3 over two such protrusions 23a, as shown in FIG. 12, preferably corresponds to a free distance F between arms 2.1, 2.2 of support frame 1. This is equivalent to a fixing structure of or on accessory item 23.

More particularly, as can be seen from FIG. 12, said protrusions 22a are devised as feet and each have a T-shaped cross section with an upper horizontal leg 23b and a lower vertical leg 23c. The overall shape of protrusions 23a takes on the form of an elongated pin or mushroom. Preferably, said upper leg 23b is located at least partly within a recess in chopping board 23, while lower leg 23c protrudes perpendicularly from chopping board 23, i. e., the underside 23d thereof. Furthermore, said lower legs 23c may taper towards a free end thereof.

As can be gathered from FIGS. 11A-11B and 12, said protrusions 23a clamp chopping board 23 against the arms 2.1, 2.2 of support frame 1. If said protrusions 23a are made of silicon material or the like, they can be slightly deformed which enhances said clamping action and use additional frictional resistance against any movement of chopping board 23 relative to the support frame 1. This can be even further enhanced by said taper of the lower leg 23c. Additionally, friction is created between said upper horizontal leg 23b and an upper surface of support frame arms 2.1, 2.2. Furthermore, wear of chopping board 23 and/or support frame 1 is prevented.

As is readily understood, said protrusions 23a do also serve whenever chopping board 23 is not used together with support frame 1 but individually, e. g., on a table or countertop, thus ensuring enough grip, so that the chopping board 23 does not move during use thereof.

As an alternative to the embodiment shown in FIG. 12, said protrusions 23a could also be located outside of arms 2.1, 2.2.

Figure 13A:
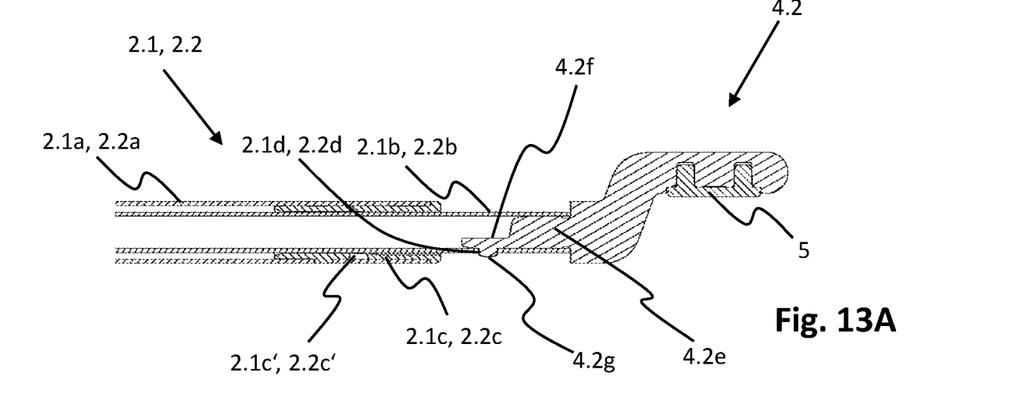
FIGS. 13A-13B show a cross section of the detail shown in FIG. 7.
Figure 13B:
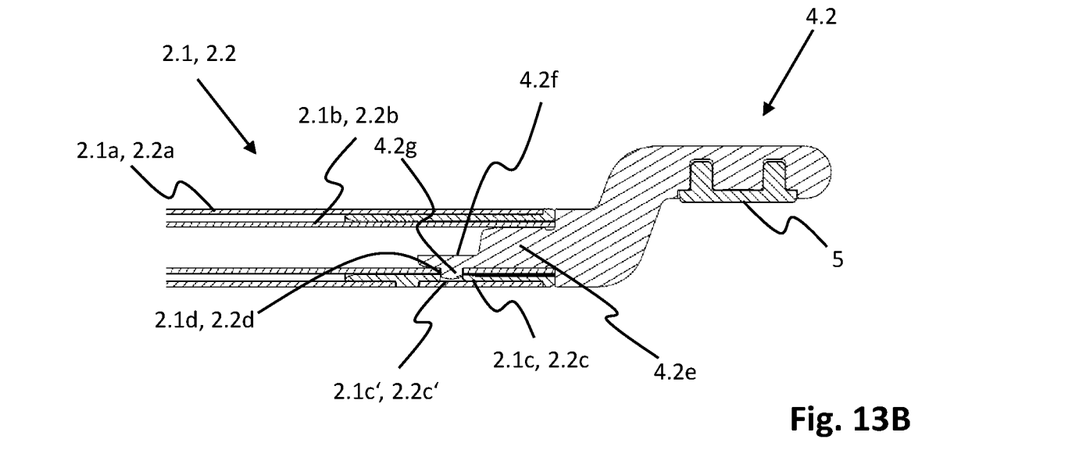

FIGS. 13A-13B show a cross sectional view of the detail already shown in FIG. 7. At FIG. 13A, a pulled-out state of first part 2.1b, 2.2b with respect to second part 2.1a, 2.2a is shown. At FIG. 13B, first part 2.1b, 2.2b is completely inserted with respect to second part 2.1a, 2.2a. Sliding motion between said first and second parts is guided by means of sealing element (bushing or sleeve) 2.1c, 2.2c, preferably a ring-shaped elastomeric or plastics seal, for slidably centering and aligning said first parts 2.1b, 2.2b and said second parts 2.1a, 2.2a, respectively. This also prevents moisture and/or dirt from entering a space between said first parts 2.1b, 2.2b and said second parts 2.1a, 2.2a, respectively.

Connecting handle 4.2 protrudes into first parts 2.1b, 2.2b with corresponding end portions 4.2e that force fit said first parts 2.1b, 2.2b at end portions thereof on the inside, as shown. Furthermore, said end portion 4.2e of connecting handle 4.2 has an extension 4.2f with a lateral pin or protrusion 4.2g, which pin 4.2g extends through a bore 2.1d, 2.2d of first parts 2.1b, 2.2b. Sealing element (i.e., bushing or sleeve) 2.1c, 2.2c presents a corresponding recess or hole 2.1c', 2.2c' for engaging said pin 4.2g when the arms 2.1, 2.2 are fully retracted, as shown at FIG. 13B. Owing to said extension 4.2f, pin 4.2g is somewhat resilient which enables retracting when fully inserting said arms 2.1, 2.2 and engaging recess or hole 2.1c', 2.2c' in position in FIG. 13B. Said pin 4.2g preferably has a spherical cap for improved functioning, i.e., for enabling a movement of the pin 4.2g transversal to a sliding movement of the arms 2.1, 2.2.

This achieves an improvement for the support frame owing to a click-effect when closing. Adding said pin avoids sliding improperly without control, giving to the user a better perception of robustness, solidity and durability.

At the other end (not shown in FIGS. 13A-13B), the connecting handle (4.1) is attached to the respective second (outer) parts 2.1a, 2.2a of arms 2.1, 2.2, preferably also in force-fitting manner, cf. portion 4.2e of connecting handle 4.2.

The invention claimed is:

1. A support frame for use with a kitchen sink, said support frame comprising:
    at least two extendable arms to hold the frame over the kitchen sink, said arms extend parallel to each other and define a free space therebetween, and are connected, at respective ends thereof, by U-shaped connecting handles;
    said arms each comprising at least first and second parts of different cross section, with the first part having a smaller cross section that is slidably inserted into the second part which has a larger cross section;
    said second parts, at an end portion thereof, each comprise a sealing element that slidably centers and aligns said first parts and said second parts;
    wherein said arms define a first plane and said U-shaped connecting handles define a second plane, and said second plane is spaced apart from and oriented parallel to said first plane; and
    wherein outer legs of said U-shaped connecting handles, in a transition region, extend in a direction oblique to said first plane and said second plane, and said U-shaped connecting handles are constructed from a plastics material and configured such that the transition region contacts a portion of the kitchen sink to produce a self-centering effect.

2. The support frame according to claim 1, wherein on one side of said transition region, facing said arms, said connecting handles extend in said first plane, and on another side of said transition region, away from said arms, said connecting handles extend in said second plane.

3. The support frame according to claim 2, wherein on said other side the connecting handles are fitted with no-slip pads on a surface oriented toward said first plane.

4. The support frame according to claim 1, wherein said arms are made of metal.

5. The support frame according to claim 1, wherein said plastics material comprises a thermoplastic resin.

6. The support frame according to claim 1, wherein the sealing element is a ring-shaped elastomeric or plastic seal.

7. A combination of the kitchen sink and a support frame according to claim 1, wherein the sink has at least one bowl having an edge at least at two opposing sides thereof, and the support frame is placed on said edge with an underside of the connecting handles.

8. An over sink work station, comprising the support frame according to claim 1 and at least one accessory item, said arms being placed at a distance that corresponds to a dimension of a fixing structure on said accessory item.

9. The work station according to claim 8, wherein the at least one accessory item comprises a chopping board made of organic material, and includes protrusions which comprise feet made from an elastomeric material.

10. The work station according to claim 9, wherein said feet have a T-shaped cross section with an upper horizontal leg and a lower vertical leg, wherein said upper leg is located on a chopping board surface, and said lower leg protrudes perpendicularly from said chopping board surface.

11. A support frame for use with a kitchen sink, said support frame comprising:
    at least two extendable arms to hold the frame over the kitchen sink, said arms extend parallel to each other and define a free space therebetween, and are connected, at respective ends thereof, by U-shaped connecting handles, wherein said arms and said connecting handles have a rectangular cross section for increasing a contact area with the kitchen sink;
    said arms each comprising at least first and second parts of different cross section, with the first part having a smaller cross section that is slidably inserted into the second part which has a larger cross section;

said second parts, at an end portion thereof, each comprise a sealing element that slidably centers and aligns said first parts and said second parts;

wherein said arms define a first plane and said U-shaped connecting handles define a second plane, and said second plane is spaced apart from and oriented parallel to said first plane; and wherein outer legs of said U-shaped connecting handles, in a transition region, extend in a direction oblique to said first plane and said second plane.

12. A combination of the kitchen sink and a support frame according to claim 11, wherein the sink has at least one bowl having a step profile at least at two opposing sides thereof, and the support frame is placed on said step profile with an underside of the connecting handles.

13. A support frame for use with a kitchen sink, said support frame comprising:

at least two extendable arms to hold the frame over the kitchen sink, said arms extend parallel to each other and define a free space therebetween, and are connected, at respective ends thereof, by U-shaped connecting handles;

said arms each comprising at least first and second parts of different cross section, with the first part having a smaller cross section that is slidably inserted into the second part which has a larger cross section;

said second parts, at an end portion thereof, each comprise a sealing element that slidably centers and aligns said first parts and said second parts;

wherein said arms define a first plane and said U-shaped connecting handles define a second plane, and said second plane is spaced apart from and oriented parallel to said first plane;

wherein outer legs of said U-shaped connecting handles, in a transition region, extend in a direction oblique to said first plane and said second plane; and said U-shaped connecting handles protrude into said first parts with corresponding end portions forming a force or friction fit connection.

14. The support frame according to claim 13, wherein said end portions of said U-shaped connecting handles have an extension including a pin or protrusion which extends through a bore of the first parts.

15. The support frame according to claim 14, wherein said sealing element includes a recess or hole configured to engage said pin or protrusion when the at least two extendable arms are fully retracted.

* * * * *